US008817063B1

(12) United States Patent
Lefar et al.

(10) Patent No.: US 8,817,063 B1
(45) Date of Patent: Aug. 26, 2014

(54) METHODS AND SYSTEMS FOR VOICE AND VIDEO MESSAGING

(71) Applicant: Vonage Network LLC, Holmdel, NJ (US)

(72) Inventors: Marc Lefar, Holmdel, NJ (US); Weiping Guo, Hillsborough, NJ (US); Kai Xin, East Brunswick, NJ (US); Joseph Guo, South River, NJ (US); Arthur Wilton, East Windsor, NJ (US); Boaz Zehavi, Jersey City, NJ (US)

(73) Assignee: Vonage Network LLC, Holmdel, NJ (US)

( * ) Notice: Subject to any disclaimer, the term of this patent is extended or adjusted under 35 U.S.C. 154(b) by 0 days.

(21) Appl. No.: 14/091,977

(22) Filed: Nov. 27, 2013

Related U.S. Application Data

(60) Provisional application No. 61/900,733, filed on Nov. 6, 2013.

(51) Int. Cl.
| | | |
|---|---|---|
| H04M 1/64 | (2006.01) | |
| G06F 13/00 | (2006.01) | |
| G06Q 30/00 | (2012.01) | |
| H04N 7/14 | (2006.01) | |

(52) U.S. Cl.
CPC .................................. H04N 7/141 (2013.01)
USPC .................. 348/14.01; 348/14.03; 348/14.06; 370/352; 379/88.04; 379/88.11; 379/88.13; 379/88.19; 379/207.02; 705/27.1; 709/206; 715/753; 719/318; 725/40

(58) Field of Classification Search
CPC ......... H04N 7/147; H04M 1/642; H04M 3/51
USPC ........... 348/14.01, 14.03, 14.06, 15; 370/352; 379/88.11, 88.19, 207.02, 88.04, 379/88.13, 352; 705/27.1; 709/206; 715/753; 719/318; 725/40
See application file for complete search history.

(56) References Cited

U.S. PATENT DOCUMENTS

| | | | |
|---|---|---|---|
| 5,371,534 A | | 12/1994 | Dagdeviren et al. |
| 5,534,914 A | * | 7/1996 | Flohr et al. .................. 348/14.1 |
| 5,896,165 A | * | 4/1999 | Rao ........................... 348/14.06 |
| 6,415,020 B1 | * | 7/2002 | Pinard et al. ............... 379/88.11 |
| 6,430,174 B1 | * | 8/2002 | Jennings et al. .............. 370/352 |
| 7,203,297 B2 | * | 4/2007 | Vitikainen et al. ....... 379/207.02 |
| 7,961,212 B2 | * | 6/2011 | Woodworth et al. ...... 348/14.01 |
| 8,085,908 B2 | | 12/2011 | Burg et al. |
| 8,117,550 B1 | * | 2/2012 | Izdepski et al. .............. 715/753 |
| 8,494,125 B2 | | 7/2013 | Burg et al. |
| 8,509,393 B2 | | 8/2013 | Donovan |

(Continued)

FOREIGN PATENT DOCUMENTS

EP          2146529 A1     1/2010

Primary Examiner — Gerald Gauthier
(74) Attorney, Agent, or Firm — Moser Taboada; Joseph Pagnotta

(57) ABSTRACT

Methods and systems for voice and video messaging are provided here. In some embodiments a method for voice and video messaging may include establishing a telecommunication session with a calling device associated with a first user in response to an indication that a call request from the calling device directed to a called identifier associated with a second user failed, providing to the calling device an option to leave a video message and an option to leave an audio message, receiving a selection from the calling device indicating the selection of the option to leave a video message, disconnecting the established telecommunication session, and receiving a video message from the calling device.

20 Claims, 7 Drawing Sheets

(56) References Cited

U.S. PATENT DOCUMENTS

| | | | |
|---|---|---|---|
| 8,712,033 B2 * | 4/2014 | Ganganna | 379/352 |
| 2005/0287993 A1 | 12/2005 | Gogic | |
| 2007/0217579 A1 | 9/2007 | Sobti et al. | |
| 2008/0189721 A1 * | 8/2008 | Buchanan | 719/318 |
| 2008/0192736 A1 * | 8/2008 | Jabri et al. | 370/352 |
| 2010/0166161 A1 * | 7/2010 | Dhawan et al. | 379/88.19 |
| 2011/0179129 A1 * | 7/2011 | McKissick et al. | 709/206 |
| 2011/0211678 A1 * | 9/2011 | Woodworth et al. | 379/88.13 |
| 2011/0243141 A1 | 10/2011 | Blackburn et al. | |
| 2011/0264755 A1 * | 10/2011 | Salvatore De Villiers | 709/206 |
| 2012/0075406 A1 | 3/2012 | Hultkrantz et al. | |
| 2012/0276877 A1 | 11/2012 | Balannik et al. | |
| 2013/0016818 A1 * | 1/2013 | Cohn | 379/88.13 |
| 2013/0083150 A1 * | 4/2013 | Howarter et al. | 348/14.03 |
| 2013/0100229 A1 | 4/2013 | Sylvain | |
| 2013/0211970 A1 * | 8/2013 | Glass et al. | 705/27.1 |
| 2013/0322609 A1 * | 12/2013 | Stifelman et al. | 379/88.04 |
| 2014/0082668 A1 * | 3/2014 | McKissick et al. | 725/40 |

\* cited by examiner

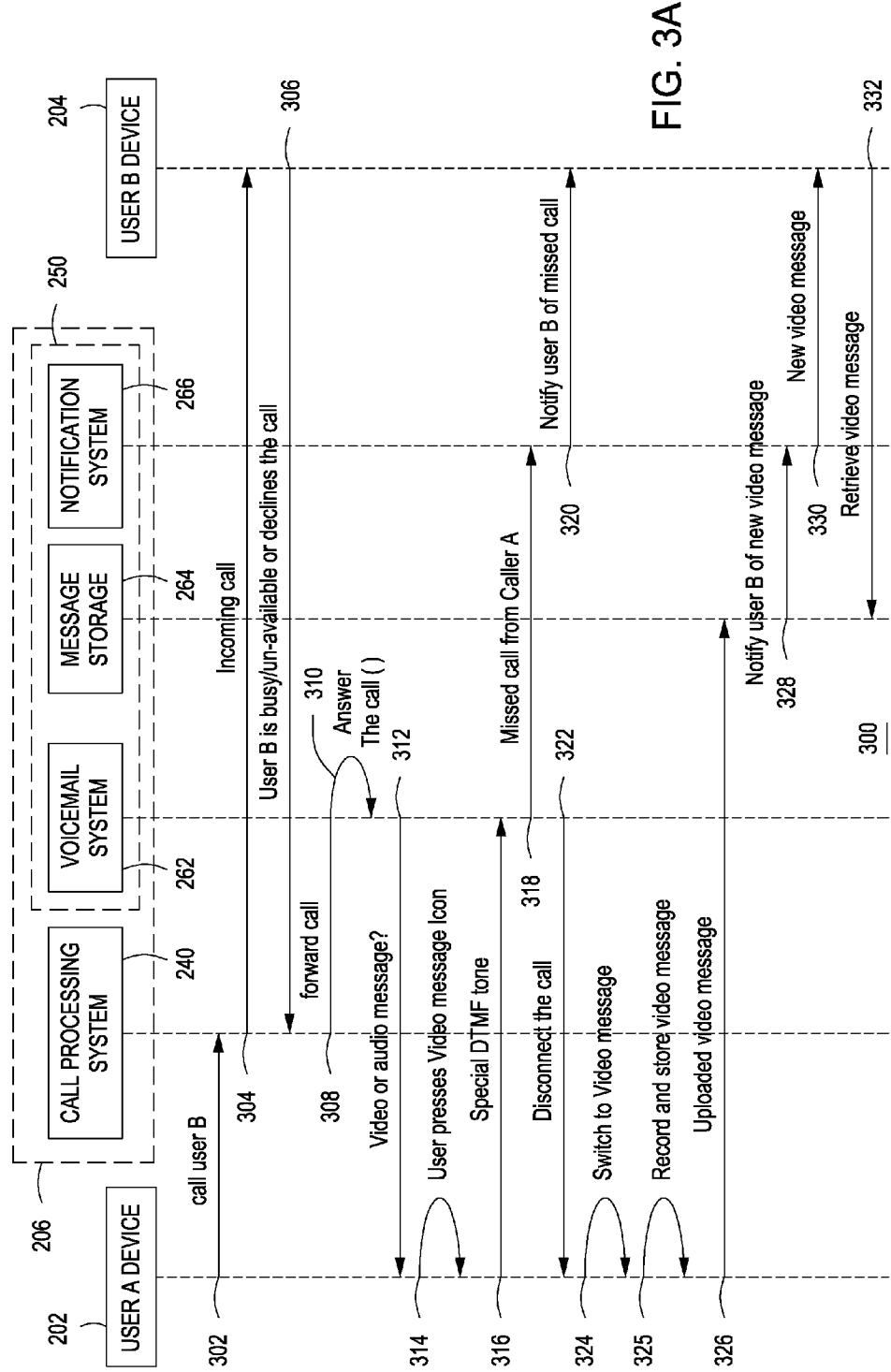

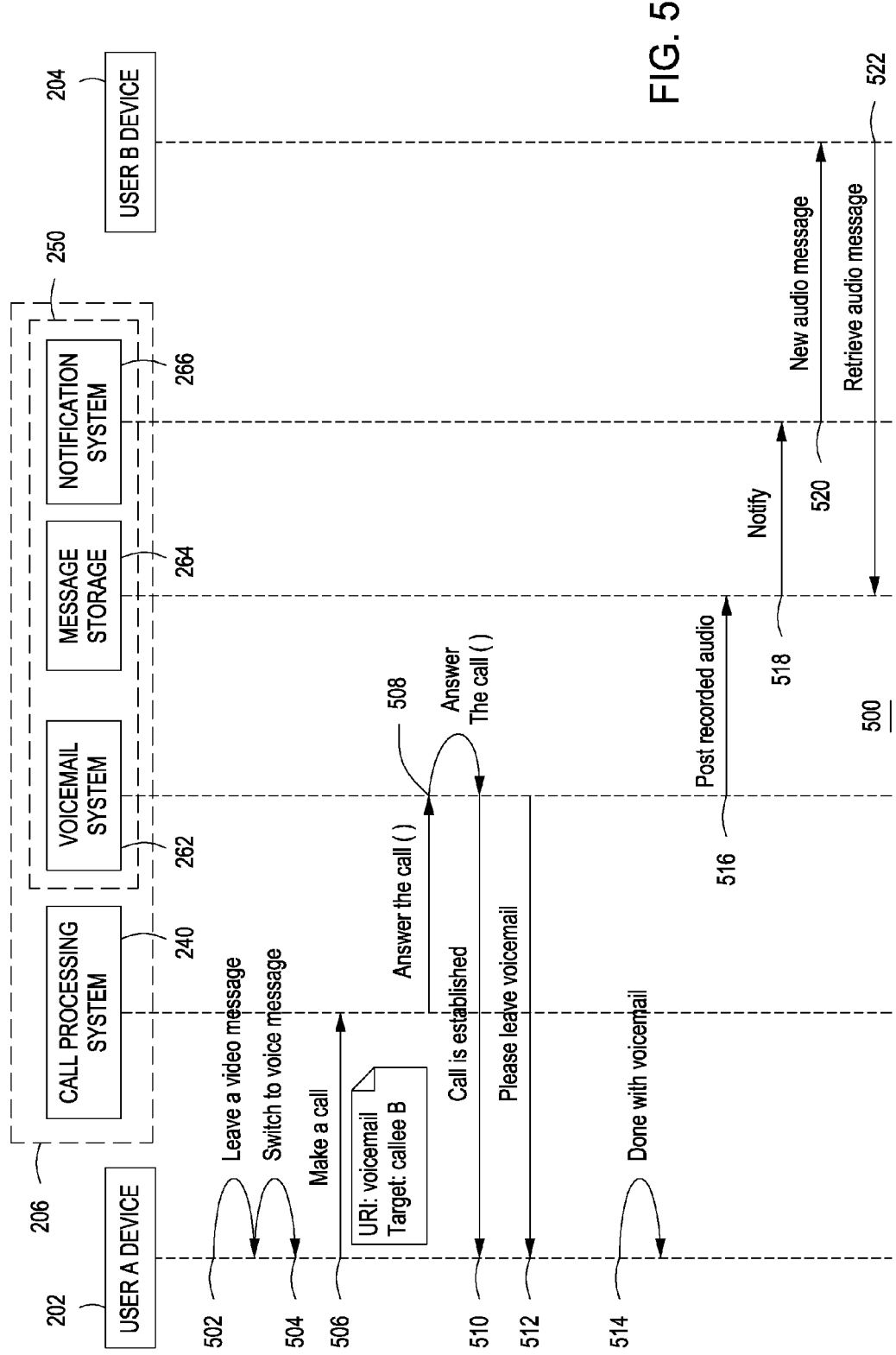

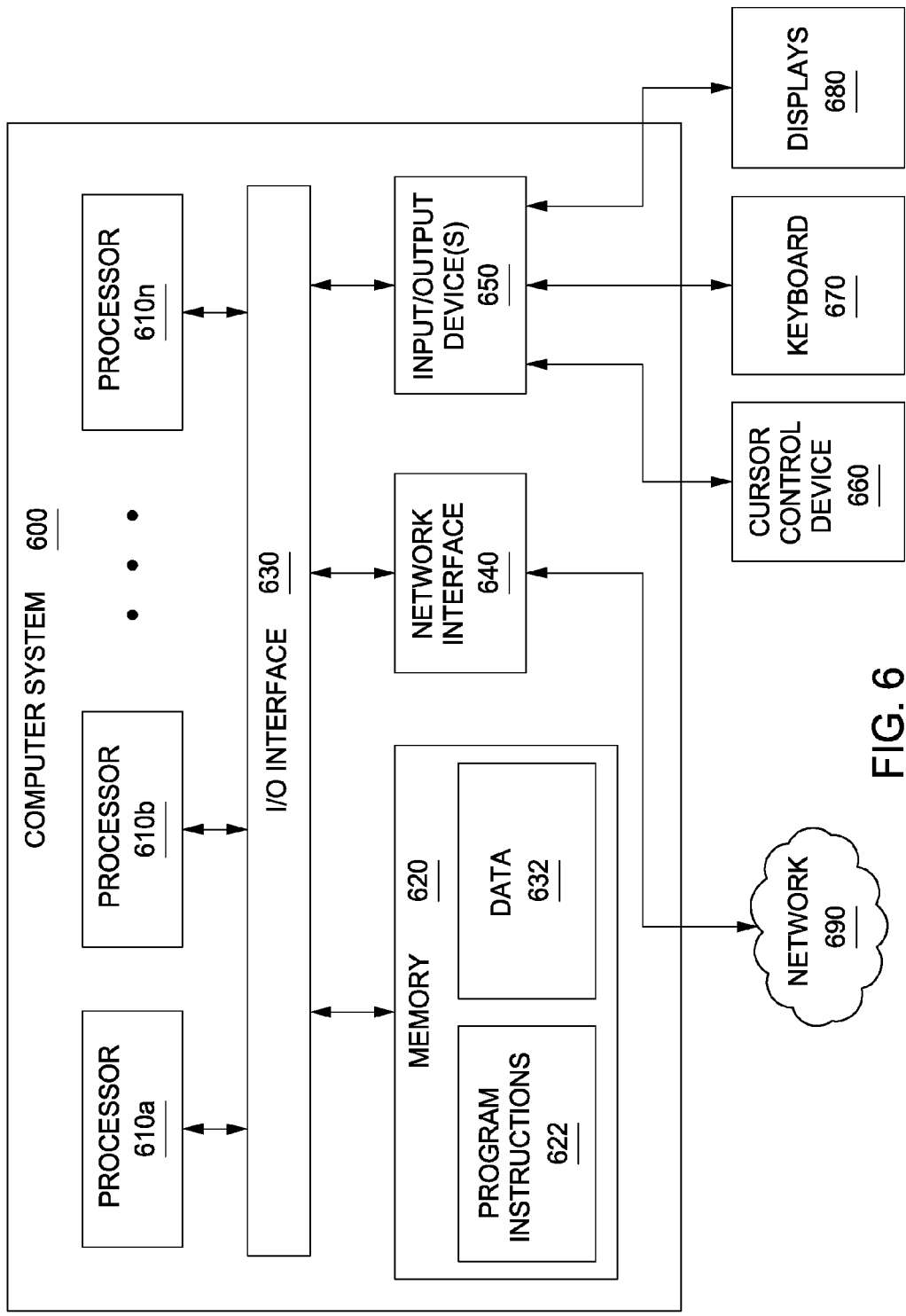

METHODS AND SYSTEMS FOR VOICE AND VIDEO MESSAGING

CROSS-REFERENCE TO RELATED APPLICATIONS

This application claims benefit of U.S. provisional patent application Ser. No. 61/900,733, filed Nov. 6, 2013, which is herein incorporated by reference.

BACKGROUND

1. Field

Embodiments of the present invention relate generally to communication systems and, more particularly, to methods and system for voice and video messaging for calls that go unanswered.

2. Description of the Related Art

Voicemail systems are generally provided to users of most telecommunication service providers. Typically, when User A (the caller), calls User B (the callee), if the User B is not available or declines the call, User A is forwarded to a voicemail system and is given the option to leave a voice message to User B.

Instead of a voice message, User A may wish to leave a video message for User B. However, conventional voicemail systems do not offer the capability to leave a video message for unanswered calls to a called party. In addition, conventional voicemail systems also do not offer the capability to switch from a voice message to a video message in a communication session. Specifically, in some situations, User A may begin recording a voice message to leave to User B for an unanswered call. During the recording of the voice message, User A may wish to switch to a video message but is unable to do so in existing voicemail systems. Similarly, User A may begin recording a video message to leave to User B for an unanswered call. However, during the recording of the video message, User A may wish to switch to a voice message due to bandwidth issues or for other reasons but is unable to do so in existing voicemail systems.

In view of the foregoing, there exists a need in the art for improved methods and systems for voice and video messaging for calls that go unanswered.

SUMMARY

Methods and systems for voice and video messaging are provided here. In some embodiments a method for voice and video messaging may include establishing a telecommunication session with a calling device associated with a first user in response to an indication that a call request from the calling device directed to a called identifier associated with a second user failed, providing to the calling device an option to leave a video message and an option to leave an audio message, receiving a selection from the calling device indicating the selection of the option to leave a video message, disconnecting the established telecommunication session, and receiving a video message from the calling device.

In some embodiments, a method for voice and video messaging may include sending a request to establish a call with a called device associated with a second user, receiving a notification from a voicemail system that the second user is unavailable, receiving an option to leave a video message and an option to leave an audio message, sending a notification to the voicemail system indicating the selection of the option to leave a video message; recording the video message, and uploading the video message.

In some embodiments, a system for voice and video messaging may include a call processing system configured to process a call request from a calling device associated with a first user directed to a called identifier associated with a second user and forward an unanswered call request to a voicemail system; a voicemail system configured to: answer the forwarded call request from the call processing system to establish a telecommunication session with the calling device associated with the first user, provide the calling device an option to leave a video message and an option to leave an audio message, receive a selection from the calling device indicating the selection of the option to leave a video message, and disconnect the established telecommunication session; and a message storage module configured to receive a video message from the calling device.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3A depicts a method for voice and video messaging for calls that go unanswered, according to one or more embodiments;

FIG. 5 depicts a method for switching from a video message to an audio message, according to one or more embodiments; and FIG. 6 depicts a computer system that can be utilized in various embodiments of the present invention, according to one or more embodiments.

Figure 1:
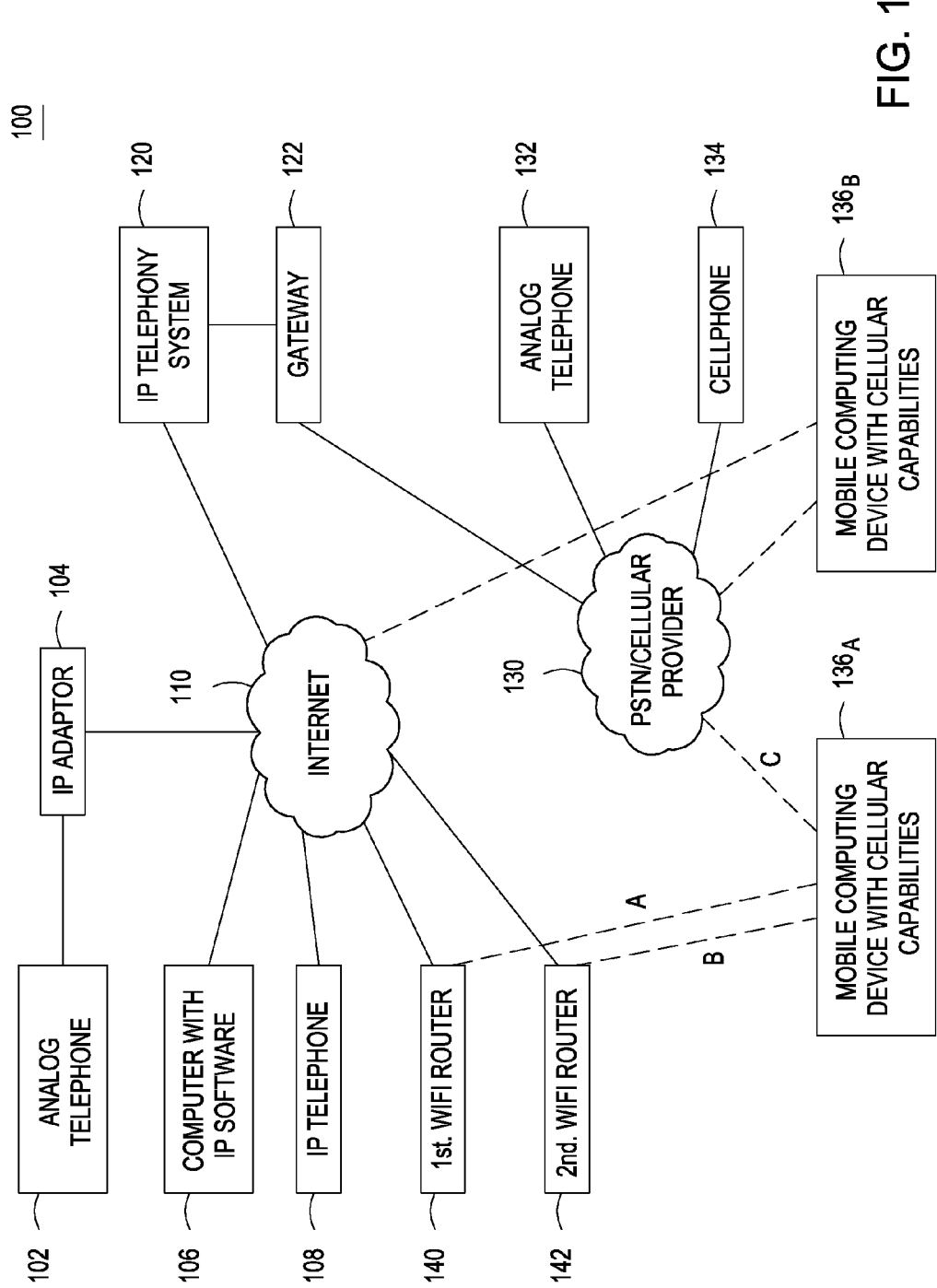
FIG. 1 depicts a block diagram of a telecommunication network, according to one or more embodiments of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention relate generally to improved methods and systems for voice and video messaging for calls that go unanswered. More particularly, some embodiments of the present invention provide users with the option to easily leave a video message instead of a traditional voicemail when a voice call, or a video call, to another user goes unanswered. Some embodiments of the present invention provide users the capability to dynamically switch from leaving a voice message to a video message, and vice versa. In some embodiments, when both a voice message and video message are left for a callee by the caller for a call that goes unanswered, the voice and video messages may be linked and the callee may be notified of the voice and video messages in a single notification message.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the following description, the terms VOIP system, VOIP telephony system, IP system and IP telephony system are all intended to refer to a system that connects callers and that delivers data, text and video communications using Internet protocol data communications. Those of ordinary skill in the art will recognize that embodiments of the present invention are not limited to use with IP telephony systems and may also be used in other systems.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a packet-switched network of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone that can facilitate voice based session calls, and an IP telephone that can facilitate data based session calls.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the APPLE IPHONE, that includes both cellular telephone capabilities and a wireless data transceiver that can establish a wireless data connection to a data network. Such a mobile computing device could run appropriate application software to conduct VoIP telephone calls via a wireless data connection. Thus, a mobile computing device, such as an APPLE IPHONE, a RIM BLACKBERRY or a comparable device running GOOGLE ANDROID operating system could be a mobile telephony device.

In still other instances, a mobile telephony device may be a device that is not traditionally used as a telephony device, but which includes a wireless data transceiver that can establish a wireless data connection to a data network. Examples of such devices include the APPLE IPOD TOUCH and the IPAD. Such a device may act as a mobile telephony device once it is configured with appropriate application software.

FIG. 1 illustrates that a mobile computing device with cellular capabilities $136_A$ (e.g., a smartphone) is capable of establishing a first wireless data connection A with a first wireless access point 140, such as a WiFi or WiMax router. The first wireless access point 140 is coupled to the Internet 110. Thus, the mobile computing device $136_A$ can establish a VOIP telephone call with the IP telephony system 120 via a path through the Internet 110 and the first wireless access point 140.

FIG. 1 also illustrates that the mobile computing device $136_A$ can establish a second wireless data connection B with a second wireless access point 142 that is also coupled to the Internet 110. Further, the mobile computing device $136_A$ can establish either a third wireless data connection C via a packet-switch network provided by a cellular service provider 130 using its cellular telephone capabilities, or establish a voice based session telephone call via a circuit-switched network provided by a cellular service provider 130. The mobile computing device $136_A$ could also establish a VoIP telephone call with the IP telephony system 120 via the second wireless connection B or the third wireless connection C.

Although not illustrated in FIG. 1, the mobile computing device $136_A$ may be capable of establishing a wireless data connection to a data network, such as the Internet 110, via alternate means. For example, the mobile computing device $136_A$ might link to some other type of wireless interface using an alternate communication protocol, such as the WIMAX standard.

Similarly, mobile computing device with cellular capabilities $136_B$ may also be coupled to internet 110 and/or cellular service provider 130. In some embodiments, mobile computing device $136_B$ may be connected to internet 110 via a WIFI or WIMAX connection, and the like, and can also establish a VOIP telephone calls with the IP telephony system 120 similar to mobile computing device $136_A$. In embodiments of the present invention, communications environment 100 may be used to establish voice based or data based telecommunications sessions between mobile computing device $136_A$ and mobile computing device $136_B$, depending on various criteria associated with each of the mobile computing devices, as will be described below in more detail.

Figure 2:
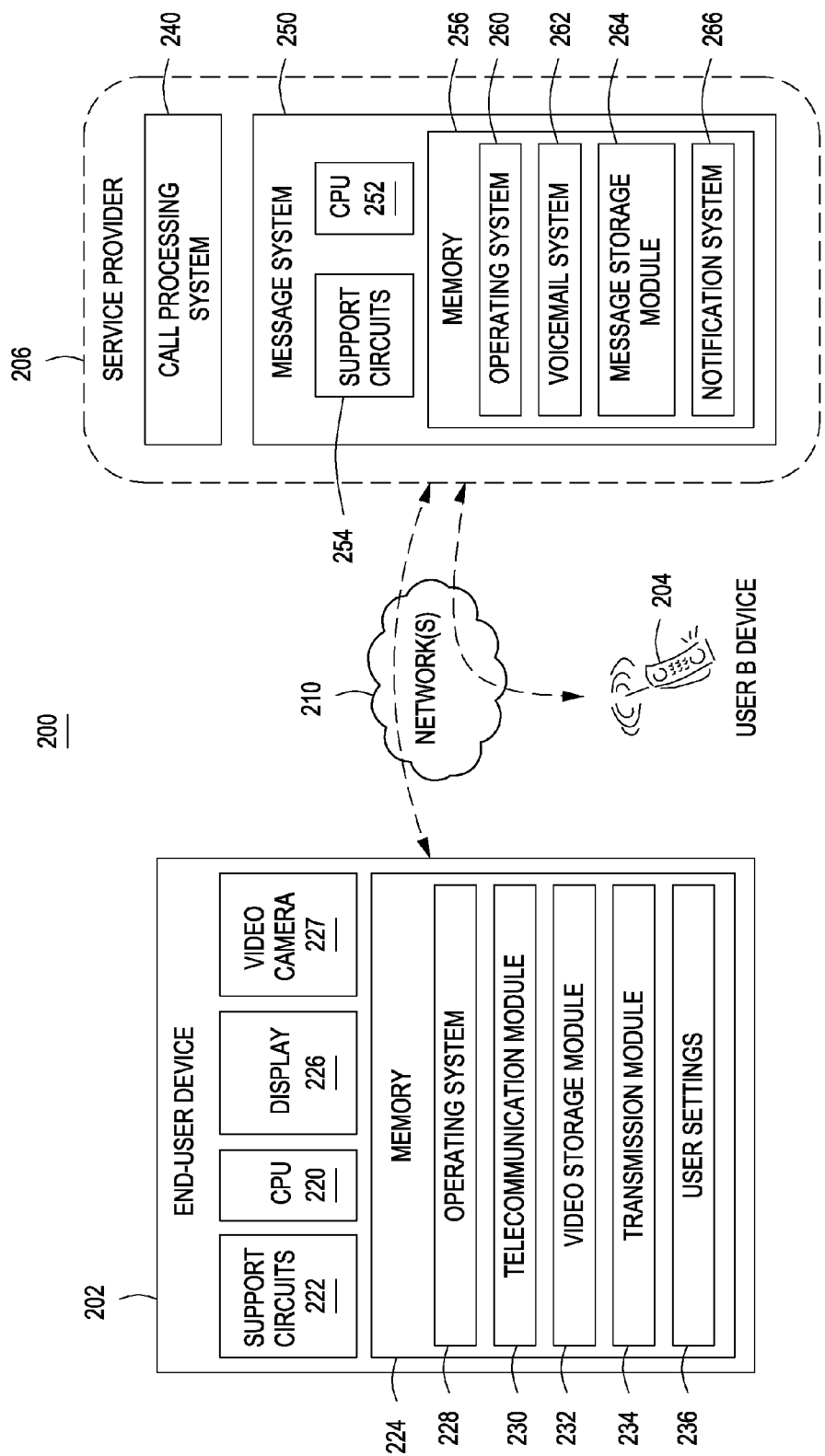
FIG. 2 depicts a block diagram of a system for voice and video messaging for calls that go unanswered, according to one or more embodiments.

FIG. 2 depicts a block diagram of a system 200 for leaving voice and video messages for calls that go unanswered in accordance with embodiments presented herein. The system 200 includes at least one telecommunication service provider network 206 that can provide telecommunication services to a plurality of end-user devices (e.g., such as User A device 202 and User B device 204) via one or more networks 210. Devices 202 and 204 may include analog phone 102, a computer with IP software 106, IP telephone 108, and/or mobile computing device with cellular capabilities 136A, 136B, and the like, as shown in FIG. 1. The telecommunication service provider 206 may include IP telephone system 120 or PSTN/cellular provider 130.

The end-user devices (e.g., User A device 202 and User B device 204) comprise a Central Processing Unit (CPU) 220, support circuits 222, memory 224, display device 226, and video camera 227. The CPU 220 may comprise one or more commercially available microprocessors or microcontrollers that facilitate data processing and storage. The various support circuits 222 facilitate the operation of the CPU 220 and include one or more clock circuits, power supplies, cache, input/output circuits, and the like. The memory 224 comprises at least one of Read Only Memory (ROM), Random Access Memory (RAM), disk drive storage, optical storage, removable storage and/or the like. In some embodiments, the memory 224 comprises an operating system 228, telecommunication module 230, video storage module 232, transmission module 234, and user settings 236.

The operating system (OS) 228 generally manages various computer resources (e.g., network resources, file processors, and/or the like). The operating system 228 is configured to execute operations on one or more hardware and/or software modules, such as Network Interface Cards (NICs), hard disks, virtualization layers, firewalls and/or the like. Examples of the operating system 228 may include, but are not limited to, LINUX, MAC OSX, BSD, UNIX, MICROSOFT WINDOWS, 10S, ANDROID and the like.

The telecommunication service provider network 206 may include a call processing system 240 and a message system 250. In some embodiments, the message system 250 comprises a Central Processing Unit (CPU) 252, support circuits 254, and memory 256. The CPU 252 may comprise one or more commercially available microprocessors or microcontrollers that facilitate data processing and storage. The various support circuits 254 facilitate the operation of the CPU 252 and include one or more clock circuits, power supplies, cache, input/output circuits, and the like. The memory 256 comprises at least one of Read Only Memory (ROM), Random Access Memory (RAM), disk drive storage, optical storage, removable storage and/or the like. In some embodiments, the memory 256 comprises an operating system 260, voicemail system 262, message storage module 264, and notification system 266. In some embodiments, the components of the message system 250 (i.e., the voicemail system 262, message storage module 264, and notification system 266) may be disposed on a single server. In other embodiments, the voicemail system 262, message storage module 264, and notification system 266 may each be separate servers communicatively coupled to each other. In some embodiments, the voicemail system 262, message storage module 264, and notification system 266 may be co-located or may be distributed cloud based services maintained by different entities.

The OS 260 generally manages various computer resources (e.g., network resources, file processors, and/or the like). The operating system 260 is configured to execute operations on one or more hardware and/or software modules, such as Network Interface Cards (NICs), hard disks, virtualization layers, firewalls and/or the like. Examples of the operating system 260 may include, but are not limited to, LINUX, MAC OSX, BSD, UNIX, MICROSOFT WINDOWS, 10S, ANDROID and the like.

The networks 210 comprise one or more communication systems that connect computers by wire, cable, fiber optic and/or wireless link facilitated by various types of well-known network elements, such as hubs, switches, routers, and the like. The networks 210 may include an Internet Protocol (IP) network 110, a public switched telephone network (PSTN) 130, or other mobile communication networks, and may employ various well-known protocols to communicate information amongst the network resources.

Referring to FIG. 3, a method 300 for leaving voice and video messages for calls that go unanswered in accordance with embodiments presented herein begins at 302 where user A attempts to establish a call to user B. In some embodiments, the call request may be originated by a telecommunication device such as, for example, user A device 202 in FIG. 2. The call may be a voice call, or in some embodiments, the call may be a video call. In attempting to establish the call with user B, a call request is sent to call processing system 240 to be processed at step 302. Call processing system 240 attempts to establish a voice connection between user A device 202 and user B device 204 at step 304. At 306, an indication is received by call processing system 240 that user B is busy, unavailable, or declines the call (i.e., the call went unanswered). At 308, the unanswered call is forwarded, or otherwise transferred, to voicemail system 262. The voicemail system 262 answers the call at 310, such that the telecommunication session is established between the user A device 202 and the voicemail system 262. In some embodiments, the telecommunication session established may be a real time transfer protocol (RTP) stream between telecommunication module 230 disposed on user A device 202 and the voicemail system 262. The telecommunication module 230 may be a mobile Internet protocol (IP) app, or other type of over-the-top (OTT) communications app, disposed on device 202.

After the telecommunication session is established between device 202 and voicemail system 262 at 310, the voicemail system 262 provides user A the option to select between leaving an audio message and a video message for user B at 312. The option provided may be in the form of an audio prompt and/or a display prompt on the display 226 of device 202, for example, such as video display icon 402 in FIG. 4 which is described below in further detail. The prompt may notify user A to select a video message display icon, or some other input, provided by telecommunication module 230 on display 226, if they wish to leave a video message. The selection of the video display icon 402 sends a signal/message to the voicemail system 262 that indicates that a video message has been selected at 314. In some embodiments, the signal/message may include a Dual-tone multi-frequency signaling (DTMF) tone (e.g., such as a DTMF-A, DTMF-B, DTMF-C, DTMF-D tone). In some embodiments, the DTMF tone may be generated from the telecommunication module 230 and sent over the RTP stream to the voicemail system 262. The voicemail system 262 detects the DTMF tone and processes the action accordingly. In other embodiments, the signal/message that indicates that a video message has been selected may be a Session Interface Protocol (SIP) message including a special reason header (e.g., a SIP BYE message), or a voice command that is processed by speech recognition modules included in voicemail system 262.

In some embodiments, if the user wishes to leave an audio message, no input is required in the user may simply wait for an indication (e.g., a tone) to start recording the audio message. In other embodiments, an audio message icon may be displayed in addition to a video message icon to allow the user to select the type of message format they wish to leave.

Prior to terminating the telecommunication session between device 202 and voicemail system 262 (i.e., disconnecting the call), the voicemail system 262 may optionally provide notification system 266 with information associated with unanswered call at 318. The notification system 266 would then notify user B of the unanswered call at 320 by sending a notification to device 204. In some embodiments, the notification of the unanswered call sent to device 204 may be handled by the call processing system 240. After receiving a video message selection at 316, the voicemail system 262 disconnects the call at 322. In some embodiments, a SIP BYE message including a special reason header may be used to disconnect the call. The SIP BYE may be used to notify the voicemail system 262 that the user selected a video or audio message, in addition to disconnecting the call.

At 324, after user A makes a selection to leave a video message, telecommunication module 230 on device 202 switches to video message mode and accesses video camera 227 to begin recording the video message. At 325, the video message is record via video camera 227 and stored. The video message may be stored in video storage module 232 as the video message is being recorded or after the video message has finished being recorded (i.e., when the user stops the recording or at the end of a predetermined time limit). In some embodiments, user A may use the video message that is created using telecommunication module 230, or may use pre-existing videos stored in video storage module 232 (i.e., device 202's video library). In some embodiments, the length of the video may be limited to a predefined video duration time, size, and/or quality (i.e., resolution) of the video message. The video duration time, size, and quality of the video message may be adjusted via user settings 236. For example, in some embodiments the maximum duration of a video may be limited to 60 seconds.

At 326, when user A has finished recording their video message at 324, the video message is uploaded to the message storage module 264 of the message system 250. A second data connection may be established between the voicemail system 262 and device 202 to upload the video message. The telecommunication module 230 may store a copy of, or a link to, the video message in a communication log file such that user A may access and review previously sent video messages. Upon receiving the uploaded video message, the message storage module 264 will store the video message in a mailbox associated with user B, or may otherwise associate the video message with user B.

The message storage module 264 provides information associated with the video message to notification system 266 at 328. At 330, the notification system 266 will send a notification to user B device 204 indicating that a video message has been left for user B. The notification sent to device 204 may include a link, or other type of pointer, to the location of the video message left by user A for user B. At 332, user B may retrieve the video message using the notification sent. In retrieving the video message, user B device 204 may send a request to message storage module 264 to access the video message using the link provided in the notification. Upon receipt of the request to access the video message, message storage module 264 may stream the video message to user B device 204. In some embodiments, user B may download the video message. In some embodiments, the notification may be an SMS or chat message displayed within a telecommunication module disposed on device 204. In other embodiments, user B may retrieve the video message left by calling voicemail system 262 directly.

In some embodiments, user A may have begun recording an audio message to leave user B after step 312. If, during the recording of the audio message, user A selects to switch to a video message at 314, the voicemail system 262 may prompt user A as to whether they wish to (a) discard the audio message, (b) send the audio message to user B separately, or (c) combine the partially recorded audio message with the video message to be recorded. If user A selects (a), the audio message will simply be discarded and not sent to user B and the method 300 will proceed to step 318 as described above. If user A selects (b)—to send the audio message to user B separately, an additional notification will be sent to user B indicating that an audio message has been received before the method 300 proceeds to step 318 as described above.

Figure 3B:
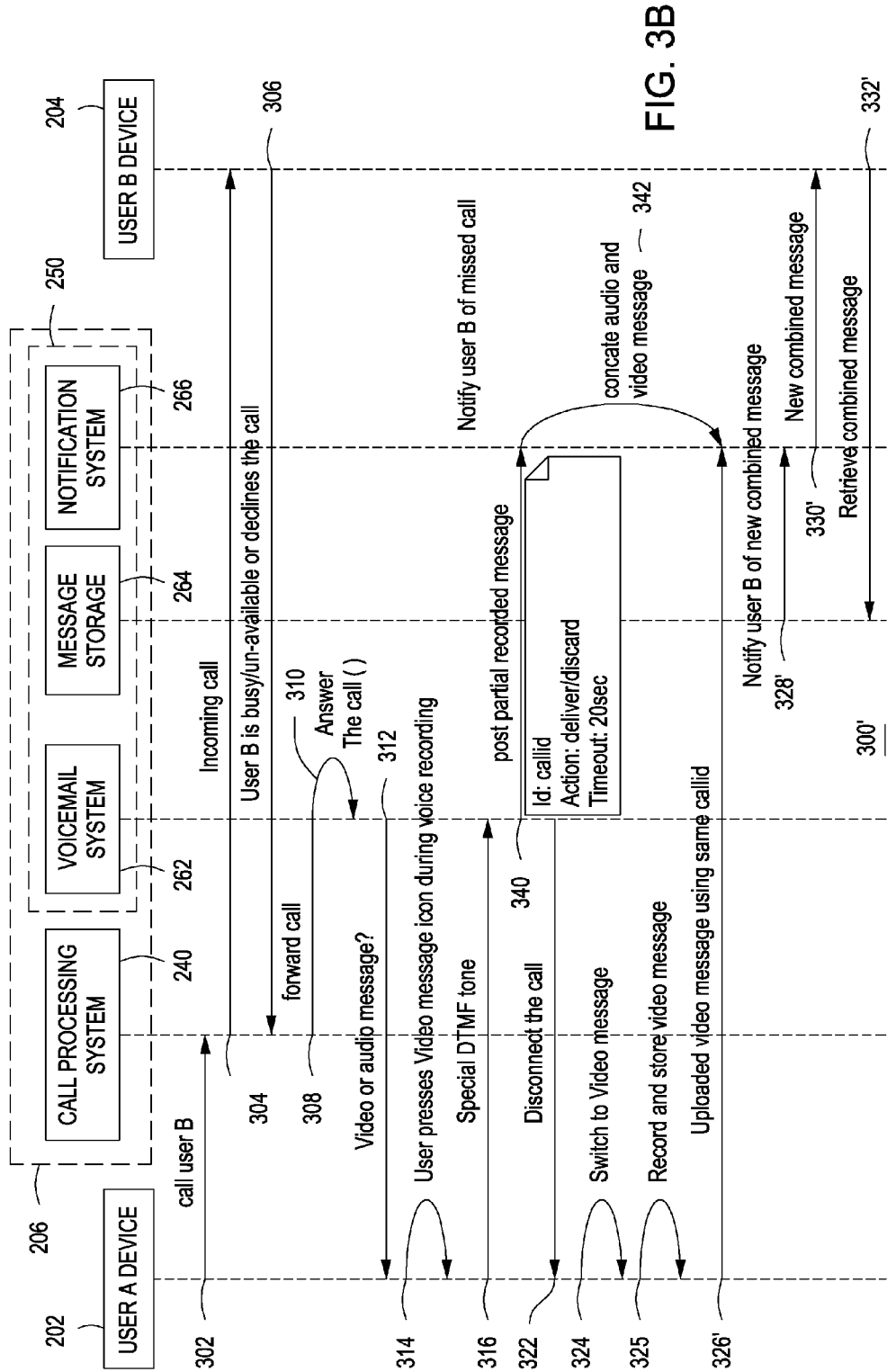
FIG. 3B depicts a method for combining voice and video messages, according to one or more embodiments.

If user A selects (c) to combine the messages, additional processing is required which is described below with respect to FIG. 3B. Specifically, if user A selects a switch to a video message at 314 while an audio message recording is in progress, the voicemail system 262 will receive a signal indicating that a video message will be recorded at 316 as described above with respect to FIG. 3A. Upon receipt of the signal, voicemail system 262 will post the partially recorded audio message to the message storage module 264 at step 340. The partially recorded message will be assigned a unique ID, which is sent to device 202 to be associated with a video message. The message storage module 264 may put the audio message into a buffer and await the video message part. If a video message with the same unique ID arrives within a predefined time window (e.g., between 5 and 30 seconds), the message storage module 264 combines, concatenates, or otherwise associates them together, at 342. If no video message with the same ID arrives within the time window, the message system 250 either discards or delivers a partial audio message. The message storage module 264 provides information associated with the combined audio and video message to notification system 266 at 328'. At 330', the notification system 266 will send a notification to user B device 204 indicating that a combined audio and video message has been left for user B. At 332', user B may retrieve the combined audio and video message using the notification sent.

Figure 4:
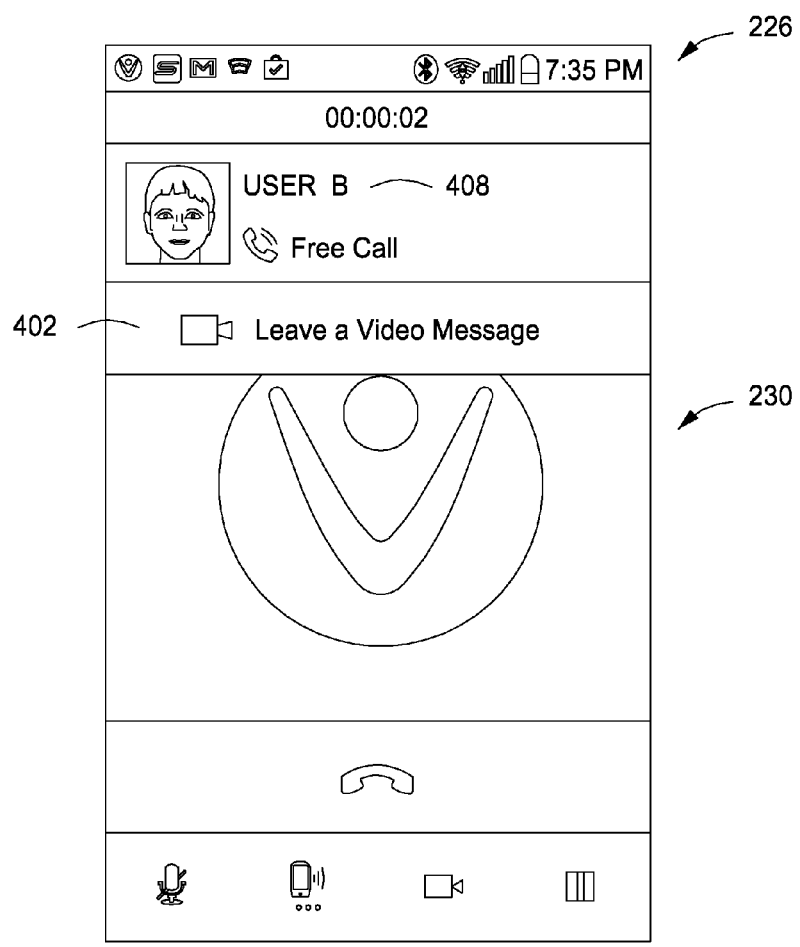
FIG. 4 depicts a graphical user interface for a telecommunication application for voice and video messaging for calls that go unanswered, according to one or more embodiments.

Referring to FIG. 4, an exemplary user interface for telecommunication module 230 is shown on display 226 of device 202 in accordance with some embodiments of the present invention. In the example shown in FIG. 4, user A has attempted to call contact 408 (e.g., user B in the method described above), but has been forwarded to voicemail system 262 since the call went unanswered. The voicemail system 262 prompts user A to select between leaving an audio message and a video message for user B. The prompt may be in the form of an audio prompt and/or a display prompt (e.g., video display icon 402) displayed via telecommunication module 230. In some embodiments, the voicemail system 262 may only prompt the caller (e.g., user A) to leave a video message if the telecommunication module 230 is an app that is provided by, or otherwise associated with, the same service provider 206 associated with message system 250. That is, the voicemail system 262 may access specific features of the telecommunication module 230 since they are provided/maintained by the same service provided. Similarly, the telecommunication module 230 may access specific features of the voicemail system 262 not otherwise available to off-net calls (i.e., calls not originated by a telecommunication module 230 associated with the same service provider as the voicemail system 262).

FIG. 5 depicts a method 500 for dynamically switching between a video message and audio message. The method 500 begins at 502 where user A records a video message for user B using the telecommunication module 230 disposed on device 202. User A may then decide to switch to a voice message at 504. Upon selection of audio message display icon, or another type of input indicating that the user wishes to switch from the video message to the voice message, telecommunication module 230 may send a request to establish a call to the voicemail system 262 so that they may leave an audio message for user B. At 506 the request may be handled by call processing system 240. Information associated with user B may be carried using a special SIP header in order for call to the voicemail system 262 to be correctly directed to a voice mailbox associated with user B. At 508, voicemail system 262 may answer the call thereby establishing a telecommunication session between the voicemail system 262 and user A device 202 at 510. Once the call is established, voicemail system 262 may prompt user A to leave a voicemail at 512. At 514, once the voicemail system 262 determines that user A is done with the voicemail, voicemail system 262 will post the recorded audio message 516 to the voice mailbox of user B in message storage module 264. Message storage module 264 will notify notification system 266 that a message has been left for user B at 518. At 520, notification system 266 will send a notification to user B device 204 indicating that a new audio message has arrived for user B. User B then may retrieve the audio message from message storage module 264 at 522. The video message can be combined with the audio message using the same approach described above with respect to method 300' in FIG. 3B.

The embodiments of the present invention may be embodied as methods, apparatus, electronic devices, and/or computer program products. Accordingly, the embodiments of the present invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

FIG. 6 depicts a computer system 600 that can be utilized in various embodiments of the present invention to implement the computer and/or the display, according to one or more embodiments.

Various embodiments of method and apparatus for routing calls based upon internal network conditions and/or external carrier network information, as described herein, may be executed on one or more computer systems, which may interact with various other devices. One such computer system is computer system 600 illustrated by FIG. 6, which may in various embodiments implement any of the elements or functionality illustrated in FIGS. 1-5. In various embodiments, computer system 600 may be configured to implement methods described above. The computer system 600 may be used to implement any other system, device, element, functionality or method of the above-described embodiments. In the illustrated embodiments, computer system 600 may be configured to implement methods 300, 300', and 500 as processor-executable executable program instructions 622 (e.g., program instructions executable by processor(s) 610) in various embodiments.

In the illustrated embodiment, computer system 600 includes one or more processors 610a-610n coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In various embodiments, any of the components may be utilized by the system to receive user input described above. In various embodiments, a user interface may be generated and displayed on display 680. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements. In another example, multiple nodes may implement computer system 600 in a distributed manner.

In different embodiments, computer system 600 may be any of various types of devices, including, but not limited to, personal computer systems, mainframe computer systems, handheld computers, workstations, network computers, application servers, storage devices, a peripheral devices such as a switch, modem, router, or in general any type of computing or electronic device.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs). In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), non-volatile/Flash-type memory, or any other type of memory. In the illustrated embodiment, program instructions and data implementing any of the elements of the embodiments described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 690), such as one or more external systems or between nodes of computer system 600. In various embodiments, network 690 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the methods described above, such as the methods illustrated in FIGS. 3A, 3B and 5. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method for voice and video messaging, comprising:
   establishing, by a telecommunication service provider, a telecommunication session with a calling device associated with a first user in response to an indication that a call request from the calling device directed to a called identifier associated with a second user failed;
   providing to the calling device an option to leave a video message and an option to leave an audio message;
   receiving a selection from the calling device indicating the selection of the option to leave a video message;
   disconnecting the established telecommunication session; and
   receiving, for storage by the telecommunication service provider, a video message from the calling device.

2. The method of claim 1, wherein each of the option to leave a video message and the option to leave an audio message is provided to the calling device in an audio prompt.

3. The method of claim 1, wherein the selection received comprises a Dual-tone multi-frequency signaling (DTMF) tone.

4. The method of claim 1, wherein the selection received comprises a Session Interface Protocol (SIP) message.

5. The method of claim 1, wherein established telecommunication session is a real time transfer protocol (RTP) stream.

6. The method of claim 1, further comprising:
   sending a notification to the second user that the call from the calling device was missed.

7. The method of claim 1, further comprising:
   sending a notification to the second user indicating that the video message has been left for the second user.

8. The method of claim 7, wherein the notification includes a link to a location of the video message.

9. The method of claim 8, further comprising:
   receiving a request to access the video message from a retrieving device; and
   streaming the video message to the retrieving device.

10. The method of claim 1, wherein the selection is received during an audio message recording.

11. The method of claim 10, wherein prior to disconnecting the established telecommunication session, the method further comprises:
    storing a recorded audio message in association with a unique identifier; and
    sending the unique identifier to the calling device.

12. The method of claim 11, wherein the video message received includes the unique identifier, and wherein the video message is stored in association with the unique identifier such that the video and audio message are associated with each other.

13. The method of claim 12, further comprising:
sending a notification to the second user indicating that the video and audio message has been left for the second user.

14. A method for voice and video messaging, comprising:
sending a request to a telecommunication service provider to establish a call with a called device associated with a second user;
receiving a notification from a voicemail system associated with the second user that the second user is unavailable;
receiving an option to leave a video message and an option to leave an audio message;
sending a notification to the voicemail system indicating a selection of the option to leave a video message;
recording the video message; and
uploading the video message to the telecommunication service provider.

15. The method of claim 14, wherein the notification comprises a Dual-tone multi-frequency signaling (DTMF) tone.

16. The method of claim 14, wherein the notification comprises a Session Interface Protocol (SIP) message.

17. A system for voice and video messaging, comprising:
a call processing system of a telecommunication service provider configured to:
process a call request from a calling device associated with a first user directed to a called identifier associated with a second user; and
forward an unanswered call request to a voicemail system;
the voicemail system configured to:
answer the forwarded call request from the call processing system to establish a telecommunication session with the calling device;
provide the calling device an option to leave a video message and an option to leave an audio message;
receive a selection from the calling device indicating a selection of the option to leave a video message; and
disconnect the established telecommunication session; and
a message storage module configured to receive a video message from the calling device.

18. The system of claim 17, further comprising:
a notification system configured to send the second user a notification indicating that the video message has been left for the second user.

19. The system of claim 18, wherein the notification includes a link to a location of the video message.

20. The system of claim 17, wherein the message storage module is further configured to receive a request to access the video message from a retrieving device, and to stream the video message to the retrieving device.

* * * * *